Sept. 30, 1924.

H. S. MYERS 1,510,153

VALVE FOR DRILLING ENGINES

Filed July 13, 1920

INVENTOR

*HARRY S. MYERS*

BY

*Edward R. Inman*

ATTORNEY

Patented Sept. 30, 1924.

1,510,153

UNITED STATES PATENT OFFICE.

HARRY S. MYERS, OF ROCKLAND TOWNSHIP, VENANGO COUNTY, PENNSYLVANIA.

VALVE FOR DRILLING ENGINES.

Application filed July 13, 1920. Serial No. 395,954.

*To all whom it may concern:*

Be it known that I, HARRY S. MYERS, citizen of the United States, residing at Rockland Township, in the county of Venango and State of Pennsylvania, have invented certain new and useful Improvements in Valves for Drilling Engines, of which the following is a specification.

The object, construction and operation of my improved valve for drilling engines are herein set forth with sufficient clearness to enable others skilled in the arts to which its construction and use respectively relate, to make and use the same.

The object of the invention is to provide a valve for a drilling engine whereby a relatively large amount of movement in the control element is converted into a small movement of the valve. This is necessary in oil drilling engines because drillers have become accustomed to the use of control mechanisms of this kind in steam engine constructions.

Another object of the invention is to provide a valve control for a gasoline engine, which can be operated at a distance from the engine.

Other objects and advantages of the invention will hereinafter appear in the following description, and the novel features thereof will be pointed out in the appended claims.

In the drawings, Figure 1 is a side elevation of a drilling engine in which is employed my valve control mechanism.

The construction of my improved drilling engine, the method of operating same and the way in which said objects are attained, are set forth in the following specification, wherein reference is made to the accompanying drawings, the various figures of which are as follows:

Fig. 1 is a side elevation of the operative mechanism mounted upon a framework.

Fig. 2 is a plan view partly in section of the fuel valve for the motor with a portion of its controlling or adjusting mechanism.

Fig. 3 is a detail of said adjusting mechanism.

In the drawings I have shown Figure 1 a drilling engine of my design, embodying my improved valve control mechanism. The mechanism of my improved drilling engine comprises the following elements: An internal combustion motor of any suitable high-speed type (750 R. P. M. approximately) the crank-shaft, fly wheel 2 and clutch 3 only of which,—for the sake of clearness—are shown; the transmission end of the crank-shaft has attached thereto, one member of a coupling; the other member of said coupling serves to attach a main gear shaft to which are keyed the gears 7 and 8. Beneath said shaft 6 is revolubly mounted a counter-shaft 9, upon which a gear 10 and a pinion 11 are keyed. Mounted above pinion 11, and meshing therewith, is a gear 12 which is keyed to the shaft of a reversible clutch pulley 14. From said pulley 14 motion is transmitted to the band wheel of the drilling rig (not shown) usually by means of a belt. Said reversible clutch pulley comprises a clutch mechanism 15, which is engaged and disengaged by means of the lever; when said clutch mechanism is engaged, said pulley 14 revolves in unison with shaft. It also comprises a reverse mechanism consisting of a brake drum 16, which co-operates with the planetary gears 17; a brake-band 18 passes around said drum, and said band is actuated by means of a lever 19 which is in turn connected to and actuated by the reach-rod 20, one end of which rod is connected to and also actuates the clutch lever.

A regulator for the fuel valve of the motor, operable from the driller's position, and which is constructed as follows. Any suitable mixing valve as 35 (see Fig. 2) may be attached to the fuel intake of the engine; to the lever 36 of said valve is attached one end of a longitudinally movable rod 37, the other end of which is provided with a spirally-grooved or screw-threaded member 38 which occupies the bore of a revoluble tubular member 39: Said member 39 carries a pin 40, the inner end of which engages the groove of said grooved member 38. Said tubular member 39 is operably attached to one end of a rod 41 and upon the other end of said rod is operably mounted the cable pulley 42. Said wheel 42 is revolubly mounted upon said rod 41, and is provided with means for frictionally turning same, consisting of the washers 43—43, which are placed in contact with the ends of the hub of said wheel 42 and are respectively caused to bear against the same by means of the nuts 44—44, on rod 41, with sufficient friction to cause rod 41 to turn when said wheel 42 is turned. Each of said washers—which are preferably leather—are secured to and positively caused to turn with the wheel by means of the arms 45. As the tubular member 39 is caused to revolve, by turning wheel 42, the engagement of pin 40 with the spiral groove of member 38, causes said member 38 and the rod 37 to move longitudinally, and thus to actuate lever 36 of said fuel-valve 35, whereby speed and power of the engine may be governed. A cable which passes around the wheel 42 leads to the derrick where it is passed around a suitable hand wheel of substantially the same construction as wheel 42, and by a suitable manipulation of said hand wheel, the driller governs the engine at will.

In the drilling of oil wells it is essential that water be supplied to the drill as it is working its way downward through the rock. While it is true that in nearly every oil field water-bearing strata are passed through, it is essential to place casing in the well to exclude the water so encountered, and thereafter no more water enters the well. However, water is essential to the drilling operation, principally for the purpose of carrying the "drillings" or fine particles of sand and rock in suspension so that they may be bailed from the well. For the purpose of meeting this requirement for water, I supply my drilling engine with a water pump 46, which is operated by means of the crank 47 carried upon the end of shaft.

The operation of the drilling engine will be readily understood from the description thereof.

In the actuation or adjustment of the fuel valve 35,—which is accomplished from the operator's position at the well,—it is necessary that a considerable degree of flexibility of the actuation device should be present, in order that the driller may not be required to exercise too great care and caution in operating same, especially when his thought and attention may be partially directed to other matters: this is the reason for providing the actuation shown in Fig. 2. To prevent an inadvertent and unintentional closing of the fuel valve to a point where the engine would be stopped, I provide a minimum limit as 56 which may be so adjusted as to keep said valve from being closed, by providing a suitable stop for the lever 36. The functional feature of the pulley 42, as described, is a safety device which insures against straining and damage to the mixing valve.

I claim the following:

1. In a valve actuator, a two part rod, one end of one part being non-revolubly connected to a valve lever, and the opposite end of the other part carrying a member by means of which that part is rotated, and means for connecting the two rod parts whereby a relatively large angular movement of the one part will produce a relatively short longitudinal movement of the other, said means comprising a spirally grooved end on one part working in a sleeve upon the other part which carries a fixed lug working in said grooved rod end.

2. The structure specified in claim 1 in which the lug is made removable, whereby the relative initial position of the rod parts may be changed to permit adjustment in the limits of the movement of the two parts relative to each other.

In testimony whereof I affix my signature in presence of two witnesses.

HARRY S. MYERS.

Witnesses:
M. R. HENDERSON,
C. W. MYERS.